(12) United States Patent
Zheng

(10) Patent No.: US 9,881,146 B2
(45) Date of Patent: *Jan. 30, 2018

(54) AUTHENTICATING DEVICE AND AUTHENTICATING METHOD

(71) Applicants: Smart Electronic Industrial (Dong Guan) Co., Ltd., Dongguan (CN); Li Zheng, Dongguan (CN)

(72) Inventor: Li Zheng, Dongguan (CN)

(73) Assignees: Smart Electronic Industrial (Dong Guan) Co., Ltd. (CN); Li Zheng (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/030,231

(22) PCT Filed: Oct. 30, 2013

(86) PCT No.: PCT/CN2013/086237
§ 371 (c)(1),
(2) Date: Apr. 18, 2016

(87) PCT Pub. No.: WO2015/054934
PCT Pub. Date: Apr. 23, 2015

(65) Prior Publication Data
US 2016/0253488 A1    Sep. 1, 2016

(30) Foreign Application Priority Data
Oct. 17, 2013  (CN) .......................... 2013 1 0487970

(51) Int. Cl.
*G06F 21/31* (2013.01)
*G06F 3/0484* (2013.01)
(Continued)

(52) U.S. Cl.
CPC ............ *G06F 21/31* (2013.01); *G06F 3/0482* (2013.01); *G06F 3/0488* (2013.01); *G06F 3/04842* (2013.01)

(58) Field of Classification Search
None
See application file for complete search history.

(56) References Cited

U.S. PATENT DOCUMENTS 7,644,868 B2 *  1/2010  Hare ....................... G06F 21/36
                                                        235/494
8,117,652 B1 *  2/2012  Lu ........................... G06F 21/36
                                                        713/182

(Continued)

FOREIGN PATENT DOCUMENTS

CN       1892542 A      1/2007
CN       101183941 A    5/2008

(Continued)

OTHER PUBLICATIONS

International Search Report for Application No. PCT/CN2013/086237 dated Jun. 30, 2014.

*Primary Examiner* — Christopher Revak
(74) *Attorney, Agent, or Firm* — Lerner, David, Littenberg, Krumholz & Mentlik, LLP

(57) ABSTRACT

An authenticating device employing an authenticating method of the invention is disclosed. In the method, a candidate character set is divided into several candidate character subsets so that at least one subset contains two or more elements. Then, these subsets are provided to the user to select. Before a first password character, or each time the user inputs a password character, the elements of the candidate character set are randomly arranged to produce the candidate character subsets. Based on which candidate character subsets are selected by the user, the characters in the selected subsets are compared with the password characters, thus completing the authentication process. By dynamically randomly generating the candidate character subsets to be selected by the user, password operation complexity is (Continued)

increased. This may comprehensively improve security and convenience of the authentication process.

10 Claims, 1 Drawing Sheet

(51) Int. Cl.
*G06F 3/0488* (2013.01)
*G06F 3/0482* (2013.01)

(56) References Cited

U.S. PATENT DOCUMENTS

| | | | |
|---|---|---|---|
| 9,286,451 B2 * | 3/2016 | Bao | G06F 21/31 |
| 9,411,465 B2 * | 8/2016 | Govindarajeswaran | G06F 3/0416 |
| 9,646,445 B2 * | 5/2017 | Lu | E05B 17/226 |
| 2005/0071637 A1 * | 3/2005 | Shirakawa | G06F 21/36 |
| | | | 713/170 |
| 2009/0106825 A1 * | 4/2009 | Cerruti | G06F 21/31 |
| | | | 726/5 |
| 2015/0312040 A1 * | 10/2015 | Zheng | H04L 9/3231 |
| | | | 713/183 |
| 2016/0021094 A1 * | 1/2016 | Dong | H04L 63/083 |
| | | | 713/183 |

FOREIGN PATENT DOCUMENTS

| | | | |
|---|---|---|---|
| CN | 201111222 Y | 9/2008 | |
| CN | 101442410 A | 5/2009 | |
| CN | 102982272 A | 3/2013 | |
| CN | 103077342 A | 5/2013 | |
| WO | WO 2011/124267 A1 * | 10/2011 | H04L 29/06 |
| WO | WO 2011/124275 A1 * | 10/2011 | H04L 29/06 |
| WO | 2013077909 A2 | 5/2013 | |

* cited by examiner

AUTHENTICATING DEVICE AND AUTHENTICATING METHOD

CROSS-REFERENCE TO RELATED APPLICATIONS

The present application is a national phase entry under 35 U.S.C § 371 of International Application No. PCT/CN2013/086237 filed Oct. 30, 2013, which claims priority from Chinese Application No. 201310487970.4 filed Oct. 17, 2013, all of which are hereby incorporated herein by reference.

FIELD OF THE INVENTION

The present invention relates to electronic safety protection technology, and more particularly, to an authenticating device and a related authenticating method.

BACKGROUND OF THE INVENTION

With continuous improvement of human quality of life and increased understanding of information security, authenticating devices and related authenticating methods have been widely used in various aspects of the lives of mobile device users. In many societies, almost every person currently owns at least one mobile phone or tablet computer, and in these devices, use of authenticating methods may often be found. This is a specific utilization of authentication apparatuses. In each mobile device, a display screen based on touch-feedback principles is generally provided. The most convenient mobile device authentication methods may include slide-unlock, face-unlock, unlock by drawing a particular pattern in a nine-location grid, and the like, all of which are publicly well-known. All these authentication methods suffer from some drawbacks. For example, slide-unlock may be easily seen by others; face-unlock may be circumvented by use of a static image; and unlock by drawing a particular pattern in a nine-location grid is a variation of a typing nine digits on a numerical keyboard, so the unlock pattern may also be easily seen by others and copied. These prior art authenticating methods used in mobile devices all lack sufficient safety and security, so they are susceptible to being circumvented by an individual spying on a user during unlocking of a device.

Earlier authentication methods were mostly performed mechanically. For instance, a combination lock extensively seen in connection with various types of bags and suitcases is one kind of mechanical authenticating device. This kind of mechanical authentication device similarly suffers from the well-known disadvantages described above, and as a result, electronic authentication devices will gradually replace mechanical authentication devices. As such, password authentication may be applied not only in various electronic mobile devices, but also in other situations where password verification is necessary. For example, various kinds of travel bags and suitcases may use electronic verification methods in their lock mechanisms. In another example, consumer electronics such as smart TVs, routers capable of interacting with humans, or central control devices may use the above-noted electronic verification methods in their user verification procedures. In a further example, the above-noted authentication methods may also be applied in access control systems, electronic locks of a vending machine, a strongbox, or an automobile access gate. Electronic verification methods may even be used in new products that may be developed in the future that may require password user verification. Electronic authenticating devices are so important that they will likely have great influence on various aspects of human life. Accordingly, it is desired to provide improved authenticating devices and corresponding authenticating methods in pursuit of increasingly higher levels of device security.

However, as described above, although authenticating devices are very important, currently available authenticating methods are not very secure. During industrial design processes, designers should consider not only product performance and security as discussed above, but also production cost and convenience. Therefore, how to balance these factors has become a driving force to continuously improve authenticating techniques, which have gradually been improved.

SUMMARY OF THE INVENTION

The object of the invention is to overcome drawbacks of prior art authentication technology, and to provide improved authenticating devices and methods, which have a high degree of security, ease of use, and a good ability to be concealed.

To the above end, the following technical solution is proposed.

According to the invention, an authenticating method for verifying password input by a user includes the following steps:

(1) Corresponding to a known character set contained in a predefined password, defining a candidate character set including a plurality of characters, said known character set being a subset of the candidate character set;

(2) Randomly distributing all the characters of the candidate character set into a plurality of candidate character subsets, such that at least one candidate character subset includes two or more characters, and correspondingly distributing and displaying characters of the candidate character subsets in a plurality of interactive regions, respectively; and (3) Receiving from a user instructions regarding selection of specific interactive regions based on the characters of the known character sets, checking one-by-one whether each character of the known character set belongs to the candidate character subsets corresponding to the specific interactive regions currently selected by the user, and confirming successful authentication and outputting signals indicating successful authentication when all the characters of the known character set belong to the candidate character subsets corresponding to the specific interactive regions currently selected by the user.

For each character of the known character set, a candidate character subset may be provided for each character of the known set. Alternatively, characters contained in each candidate character subset may be changed for each character of the known set, thus providing a candidate character subset for each character of the known set. Specifically, step (2) is performed before checking of each character of the known character set, such that each candidate character subset corresponding to a respective interactive region is updated for each character.

Preferably, during step (2), all of the characters of the respective candidate character set are randomly generated and discretely distributed. Preferably, during step (1), the known character set is equivalent to the collection of all the candidate character subsets, whereas during step (2), each candidate character subset includes two or more characters.

According to one embodiment of the invention, each interactive region is used for receiving a touching action of a user to confirm this action as the user's instructions of selecting a corresponding interactive region. According to another embodiment of the invention, each interactive region is associated with a corresponding input circuit, and switching on of each input circuit is transformed into instructions of selection of an interactive region associated with the input circuit.

According to one embodiment of the invention, during steps (2) and (3), according to a default order of all characters in the known character set, for each character, several interactive regions are determined based on the aforementioned method and selection of specific interactive regions by the user; after selection by the user, it is checked whether a current character belongs to a candidate character subset corresponding to a specific interactive region currently selected by the user; current checking of a result is set as a temporary label; and it is determined based on the temporary label that authentication is successful if no character is labeled as an authentication failure.

According to another embodiment of the invention, during steps (2) and (3), according to a default order of all characters in the known character set, for each character, several interactive regions are determined based on the aforementioned method and selection of specific interactive regions by the user; correlation data between the candidate character subset corresponding to a specific interaction region selected currently by the user and a current character is established and stored; the same establishing and storing operation is performed for each successive character until the last one; after selection instructions are performed by the user for all the characters of the known character set, all correlation data are used, and each correlation data is checked to determine whether a current character contained in the correlation data belongs to the candidate character subset contained in the same correlation data; a current checking result is set as a temporary label; and based on the temporary label, it is determined that authentication is successful if no character is labeled as an authentication failure.

In another embodiment of the invention, to reduce the number of steps of the checking procedure, when any character of the known character set is checked that the current character is not within the candidate character subset corresponding to a specific interactive region currently selected by the user, the method is ended, and the succeeding steps are avoided.

According to the invention, an authenticating device for performing one or more of the methods recited above includes a control unit, a memory unit, and a touch screen, said memory unit storing the predefined password containing the known character set therein, wherein the control unit is intended to execute a program implemented by said method; the memory unit is intended to store candidate intermediate data generated by the program implemented by said method; and the touch screen is intended to provide said interactive regions to the program implemented by said method, to receive the user's selection of the interactive regions and transform said selection into instructions indicating selection of the specific interactive regions.

According to the invention, another authenticating device for performing one or more of the methods recited above includes a control unit, a memory unit, a number of input circuits, and a screen, said memory unit storing the predefined password containing the known character set therein, wherein the control unit is intended to execute a program implemented by said method; the memory unit is intended to store candidate intermediate data generated by the program implemented by said method; the touch screen is intended to provide said interactive regions to the program implemented by said method; and the input circuits are electrically connected to the control unit such that each input circuit corresponds to a respective interactive region, and each input circuit is intended to switch itself on according to instructions indicating selection of the specific interactive regions.

The present invention may have one or more of the following benefits compared to prior art technology.

In the present invention, each character contained in a predefined password is taken as a subset. By providing candidate character sets containing at least the same number of characters as the characters contained in the predefined password, primary fuzziness is produced for the password. Furthermore, before authenticating a first character or each character of the predefined password, the candidate character set is by default or randomly divided into multiple subsets, and these subsets are displayed in respective multiple interactive regions, so that the user can select these regions. As such, selection of a specific interactive region by the user corresponds to multiple character elements, and each time the user makes a selection, the arrangement and combination of the character elements of respective interactive regions for the user may be different, so fuzziness of the selected characters is greatly enhanced. Even in a case in which the click selection operation of the user is seen by an unauthorized person during the password-verifying process, the unauthorized person will not be able to ascertain the accurate password sequence, thus greatly improving the security of the password verification. On the other hand, after several characters are randomly sorted into multiple groups, each group may contain more than one character. In this situation, the user no longer relies upon buttons (area) to input the password, the number of the buttons being the same as that of the interactive regions. The number of conventional buttons is decreased to that of the interactive regions of the invention. Accordingly, operation convenience is improved for the user without affecting the security of the authentication method.

DETAILED DESCRIPTION OF THE INVENTION

Various embodiments of the invention are described below in greater detail with reference to the drawings.

Figure 1:
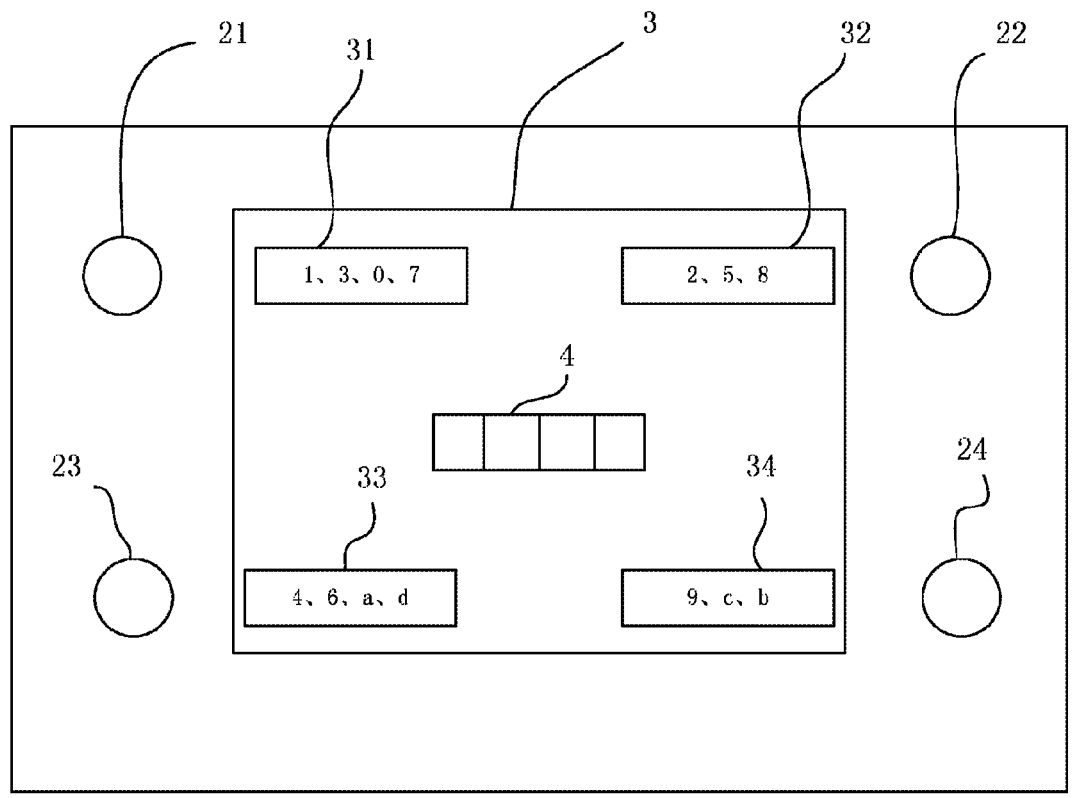
FIG. 1 shows a schematic view of an electrical structure of an authenticating device according to an embodiment of the invention.
Figure 2:
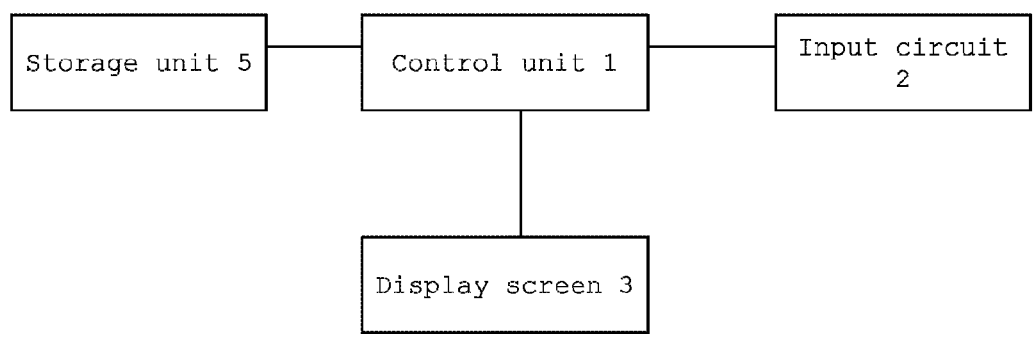
FIG. 2 shows an operation interface of the authenticating device of FIG. 1.

Referring to FIGS. 1 and 2, an authenticating device of an embodiment of the invention includes a control unit 1, a memory unit 5, a display screen 3 and several input circuits 2. The control unit 1 operates to control the entire device and serves to perform a program according to an authenticating method of the invention, so as to perform an authenticating process. The memory unit 5 functions to permanently or temporarily store various intermediate data generated during operation of a program according to an authenticating method of the invention. The intermediate data may include, for example, a user's predefined password, some or all candidate information units, and selection information units to be formed subsequently. The memory unit 5 may also store predefined labels such as image, voice, and status, which may be stored during operation of the authenticating program. A person having ordinary skill in the art would realize that the predefined password of the present method and device should be permanently stored. Regarding other data used in the methods of the invention, the program flexibly determines whether such data will be stored in the memory unit. The memory unit of the invention should not be understood as being limited to the storage technologies described herein. Under the control of the control unit 1, the authenticating methods of the invention permit human-machine interaction by means of the input circuits 2 and display screen 3 to accomplish the password verification operation of the invention.

In the interface of FIG. 1, a display screen 3 including four corners and a central area is shown. There are four interactive regions 31-34 located at the four corners of the display area, respectively, for displaying all elements of four candidate character sets for the user. Each element is a character. An output area 4 located at the center of the display screen is mainly intended for indicating verification progress during password input process by the user. It shall be understood that in the invention, there is no limit regarding location of the interactive regions as would be understood by person having ordinary skill in the art.

Four circular buttons 21-24 located close to the four interactive regions of the display screen are buttons of the four input circuits 2 for switching on these circuits 2, respectively, so that the control unit 1 is able to detect switching on of a specific input circuit 2 and then transform it into an instruction of selecting an interactive region associated with the input circuit (button). In this manner, a user input is accepted. Accordingly, it is evident that selection of a specific interactive region may be accomplished by pressing a corresponding button adjacent to the respective interactive region.

The above user input implementation manner of selecting interactive regions with corresponding buttons is often seen on bags, suitcases, and POS terminals. According to a different user input implementation manner, the input circuit 2 may be simplified, and the display screen may be implemented by a widely-used touch screen having touch function. As such, the device and method of the instant invention may be combined with various types of mobile user input implementation manners.

No matter how the hardware is optimized and selected, it is to be understood that implementation of the authenticating method of the invention will not be limited to any particular hardware implementation.

The authenticating method of the invention is based on the following general principles.

At first, a memory unit stores the predefined password of the user and, input means of the predefined password may be flexibly configured in a manner as would be known by a person having ordinary skill in the art. It is well known that a password is generally constructed of characters. A simple password may include 10 numbers 0-9. Of course, a password may also be constructed of other characters, such as English letters. For convenience of description of the invention, it is assumed that characters such as 0-9 and English letters a-d and the like are presented in FIG. 1. Each password sequence may be regarded as a known set of characters, and each character is an element of the set. Of course, the password sequence should be arranged according to a certain order. In the method of the invention, a candidate character set is defined for the password sequence composed of multiple known characters arranged according to a certain order. In this candidate character set, all the characters of the password sequence, i.e., all of the elements of the known character set, should be included therein. In other words, the set of known characters is a subset of the candidate character set. The candidate character set is obtained by extending all elements of the set of known characters. This is because when the user creates a preset password, some of a group of characters are normally selected. As such, in general, a candidate character set is not completely equal to the known set of characters. However, the present invention does not exclude situations where the candidate character set and the known character set are completely equal to each other. According to mathematics, complete equality is a specific example of inclusion.

Next, after the candidate character set and the known set of characters are defined, all the elements of the candidate character set are randomly distributed into several candidate character subsets corresponding to each respective element of the known set of characters. At least one candidate character subset will be ensured to include two or more elements. The elements of each candidate character subset are correspondingly distributed into and displayed by several interactive regions. For example, four groups of characters displayed by four respective interactive regions are irregularly arranged. It should be understood that four groups of randomly arranged characters follow some regularity such as ASCII code, natural numbers, and the like; this situation should be understood as a specific example of the random distribution of the invention and should not be limit the present invention. There are 14 total characters in the four interactive regions, and which belong to four candidate character subsets. As these 14 characters are grouped into four candidate character subsets, generally, each candidate character subset necessarily contains multiple character elements. This ensures multi-vocal expression after each candidate character subset is displayed in a corresponding interactive region. Choosing of a specific candidate character subset will not be directed to a certain unique character, thus significantly improving security. In the case that the several characters of the candidate character set are distributed to multiple subsets, and the number of the subsets is smaller than the number of characters of the candidate character set, at least one candidate character subset will contain two or more character elements. It is also possible that some candidate character subsets may contain no characters, while others of the candidate character subsets contain all characters of the candidate character set. This will also ensure that at least one candidate character subset will contain two or more character elements. In theory, as long as only one candidate character subset contains more than one character element, the resulting authentication process will definitely be multi-vocal, and the objects of the invention will be met. However, the preferred situation is that each candidate character subset contains two or more character elements, to enhance the fuzziness of the password verification. Various modified embodiments of the invention may be conceived of by a person having ordinary skill in the art based on the possibilities described above, and therefore, description of such variations is omitted herein.

The invention contemplates an embodiment in which all elements corresponding to each password element of the password sequence are randomly distributed in the candidate character set, and during the process of authentication, the contents of each candidate character subset are also updated in real time. That is, the character layout presented by respective interactive regions is updated in real time, thus guaranteeing higher security. The invention also contemplates an embodiment in which the candidate character sets are randomly distributed so as to form respective candidate character subsets and to show characters in the four interactive regions, but the randomization is only done before verification of a password element of a first location. Then, during the verification process for subsequent password elements, the candidate character subsets are no longer updated. This embodiment is also feasible. Although this embodiment reduces the complexity of computation, it still maintains multi-vocality and concealment. It will not be necessary for the user to reread contents of the other candidate character subsets for each password element, so this embodiment can improve the convenience of the password verification method.

In addition, in the aforementioned embodiment in which the candidate character set is divided into multiple candidate character subsets, distribution of the elements of the candidate character subsets is random and arbitrary. However, non-random distribution of the elements is also possible in the present invention. For instance, several layout solutions in which the candidate character subsets are randomly arranged may be stored in the memory unit 5 in advance. These different layout solutions may be ranged in accordance with a certain order. Before verification of each element of the password, a different layout solution may be used according to its rank in the order. As a result, layout solutions may be dynamically updated, and it can be assured that all characters in the candidate character subset of a certain solution are randomly arranged.

Next, after the candidate character set is divided into several candidate character subsets corresponding to each element of the known character set, respectively, a user selection of a specific interactive region is received based on respective elements of the known character set. It is then determined whether or not the respective candidate character set corresponding to a specific interactive region selected currently by the user includes each character of the password sequence. When the candidate character subset corresponding to the specific interactive region currently selected by the user includes all of the elements of the known character set, it is confirmed that authentication is achieved, and the device outputs a signal indicating successful authentication. As discussed above, according to one embodiment of the invention, the user may input a selection instruction by clicking the buttons 21-24. According to an embodiment not shown, when a touch screen is used for input in lieu of the buttons 21-24, a user clicking of a corresponding interactive region has the same effect of inputting a selection instruction by clicking the buttons 21-24. A clicking action is transferred to the control unit 1 via said touch screen and transformed into an instruction of selecting a corresponding interactive region 31-34. No matter what input method is used to input the user selection of an interactive region, the input is in essence the selection of the candidate character subset. Therefore, the input means that the legal user knows the character elements shown in the interactive region and has input the correct content. This operation is applied to each element. According to the predefined order of the password sequence, and for each password character, the user selects a corresponding interactive region, so the interactive region corresponding to each password character is obtained. For this method, authentication is achieved by checking one-by-one whether each element of the known character set belongs to the candidate character subset corresponding to the specific interactive region selected by the user. When a current element of the known character set belongs to the candidate character subset corresponding to a specific interactive region currently selected by the user, it is confirmed that the user has input the correct password character. Otherwise, the wrong password character has been input by the user. After all of the sequential user selections match correctly with all of the corresponding password characters, this means that the password has been successfully verified. In this instance, the authenticating device outputs a successful authentication signal to an external unit for a further operation, such as unlocking, a transaction, starting a program, and the like, thereby ending the verification process. Of course, if the user selects a candidate character subset corresponding to a specific interactive region that fails to contain a particular password character, this means that authentication of this specific password character fails. In such a circumstance in the present method, to ensure security, subsequent steps may be terminated via the program, and a warning may even be provided.

In the aforementioned embodiment, a candidate character set is divided into multiple candidate character subsets, the number of candidate character subsets is the same the number of interactive regions, and number of interactive regions is smaller than the number of elements within the candidate character subsets. Therefore, computation times are increased to overcome drawbacks resulting from insufficiency of numbers of the interactive regions. Each time the candidate character subset corresponding to the interactive region is updated, random re-arrangement is performed, to ensure security.

The aforementioned methods of the invention can be accomplished by a computer program. The design of the program may be flexible. To easily understand the present invention so as to easily practice the same, an exemplary computer program implementation of the verifying method of the invention is described below with reference to the drawings.

A first kind of verification implementation:

First, according to order of arrangement of the respective elements of the known character set (i.e., the order of arrangement of the password characters included in the password sequence), the following sub-steps are performed:

1. All the elements of the candidate character set are selected and divided into multiple sets, each of which is a candidate character subset. The number of the subsets is the same as that of the interactive regions of the authenticating device. Preferably, each candidate character subset contains at least two elements. Each candidate character subset is assigned to correspond to a respective interactive region, and all elements of the respective candidate character subsets are correspondingly arranged into respective interactive regions such that each interactive region displays several characters.

2. The program waits for user input. After reading characters shown in the candidate character subsets of the respective interactive regions of the display screen, the user determines a target interactive region. The selection operation is conducted manually by the user. After the program accepts the user selection of a specific interactive region based on a current element of the known character set, the program immediately checks whether the current element of the known character set belongs to the displayed candidate character subset of the specific interactive region selected by the user. This checking operation may be performed by comparing the current element with the elements of the candidate character subset, as would be understood by a person having ordinary skill in the art. When the check result is affirmative, that is, when the current element belongs to the candidate character subset, the program sets the status of a temporary label variable as authentication success, which, for example, may be assigned the value "Y." Otherwise, the status of the temporary label variable is set as authentication failure and assigned the value "N."

The above two steps are performed for each successive password character. In theory, verification of each password character requires the above two steps.

After completion of the cycle above for all of the password characters, the user has chosen the respective interactive regions, so password input has been completed. Therefore, subsequent feedback actions may be performed. Specifically, in present method, the result of the authentication process may depend upon the status of the label variable. If the label variable is "Y," then authentication is successful, and subsequently, a signal showing successful authentication is output for further operation. Otherwise, the above cycle is terminated if the label variable is assigned "N" even for only a single user input selection. In this situation, it is confirmed that authentication has failed, and a signal showing failed authentication is output, and the result is fed back to the user.

A second kind of verification implementation:

First, according to the arrangement order of the respective elements of the known character set, the following sub-steps are performed.

1. All the elements of the candidate character set are processed and divided into multiple sets, each of which is a candidate character subset to be displayed in a corresponding interactive region. The number of subsets is the same as the number of interactive regions of the authenticating device. Preferably, each candidate character subset contains at least two elements. Next, each candidate character subset is assigned to correspond to an interactive region, and all elements of the respective candidate character subsets are correspondingly arranged into respective interactive regions, such that each interactive region displays several characters.

2. The program waits for user input. After reading the characters displayed in the candidate character subsets of the respective interactive regions of the display screen, the user determines a target interactive region. The selection operation is conducted manually by the user. Different from the aforementioned first kind of verification implementation, after the program receives the user selection of a specific interactive region based on a current element of the known character set, a check is not performed immediately. Rather, the program establishes correlation data between the current element and the candidate character subset of the respective interactive region selected by the user, and the program stores this data into the storage unit 5. After that, the program returns back to step 1 to verify the next password character (element), and steps 1 and 2 are repeated until the last character is verified. Then, the next steps are performed.

Once all of the elements of the known character set are selected by the user, thus establishing a corresponding relationship among the respective elements and dynamic candidate character subsets, the current cycle ends. Consequently, a new cycle may begin. Specifically, the corresponding relationship data is invoked, and the program checks whether a current element included in each group of corresponding relationship data belongs to a candidate character subset associated with said data. If the answer is yes, then the current checking result is given a temporary label, and a corresponding label variable indicates authentication success. Otherwise, if the current element fails to belong to a corresponding candidate character subset selected by the user, then the label variable indicates authentication failure. The current cycle ends once there is at least one verification failure as indicated by the label variable. In this case, it is confirmed that authentication has failed based on the indication of the label variable, and a signal representing authentication failure is output, thus improving program efficiency. If all of the elements are checked and no authentication failure result is found, then it is confirmed that authentication has succeeded based on said temporary label, and a signal representing authentication success is output.

It should be emphasized that various software programs may be created to implement any one of the aforementioned authentication methods due to use of different program languages, different programming styles, and the like. The embodiments described above are only for illustrative purposes and are to be understood as not limiting the scope of the invention.

In summary, the authenticating device embodiments of the invention are based on the authenticating method embodiments of the invention. By causing fuzziness to the input of the password elements by the user's selection of interactive regions of the authenticating device, the input contents become multi-vocal, thus ensuring that the actual password elements will not be given away to an unauthorized observer during the user input process. In addition, by randomly generating a dynamic effect of the content input by the user, password operation complexity is increased. These features comprehensively improve the security and the convenience of the authentication process.

Although various embodiments of the invention have been illustrated above, a person having ordinary skill in the art will understand that variations and improvements made upon the illustrative embodiments fall within the scope of the invention, and the scope of the invention is only limited by the accompanying claims and their equivalents.

The invention claimed is:

1. An authentication method for verifying password input to an authentication device by a user, comprising the following steps:
   (a) defining a candidate character set including a plurality of characters, a subset of the candidate character set being a known character set contained in a predefined password;
   (b) randomly distributing all of the characters of the candidate character set into a plurality of candidate character subsets such that each candidate character subset includes two or more characters, and displaying all of the characters of the plurality of candidate character subsets in a plurality of interactive regions, respectively, all of the characters of each candidate character subset being randomly generated and distributed; and
   (c) receiving from the user a series of selections of specific ones of the plurality of interactive regions, checking whether each selected interactive region displayed a character of the known character set contained in the predefined password, and confirming successful authentication and outputting a signal indicating successful authentication when each of the interactive regions containing the characters of the known character set contained in the predefined password were directly selected by the user,
   wherein step (b) is repeated before each user selection of a specific one of the plurality of interactive regions, such that the characters in the plurality of candidate character subsets are randomly generated and distributed before each user selection.

2. The authentication method as recited in claim 1, wherein during step (a), the characters of the known character set are the same as the characters of the candidate character set.

3. The authentication method as recited in claim 1, wherein during step (b), each of the plurality of candidate character subsets includes two or more characters.

4. The authentication method as recited in claim 1, wherein each of the selections of the specific ones of the plurality of interactive regions is indicated by a corresponding touching action of the user.

5. The authentication method as recited in claim 1, wherein each interactive region is associated with a corresponding input circuit, and switching on of each input circuit is transformed into instructions of selection of a respective one of the interactive regions associated with the corresponding input circuit.

6. The authentication method as recited in claim 1, wherein during step (c), a result of checking whether each selected interactive region displayed a character of the known character set contained in the predefined password is stored as a temporary label, and successful authentication is confirmed when the temporary label is not labeled as an authentication failure for any of the selections of the interactive regions.

7. The authentication method as recited in claim 1, wherein during step (c), a result of checking whether each selected interactive region displayed a character of the known character set contained in the predefined password is stored as correlation data for all of the selections in the series, and successful authentication is confirmed when a temporary label is not labeled as an authentication failure for any of the correlation data.

8. The authentication method as recited in claim 1, wherein during step (c), when any of the selected interactive regions do not display a character of the known character set contained in the predefined password, a signal representing authentication failure is output.

9. The authentication device for performing the method as recited in claim 1, comprising a control unit, a memory unit, and a touch screen, said memory unit configured to store the predefined password containing the known character set therein, wherein the control unit is configured to execute a program implemented by said method, the memory unit is configured to store candidate intermediate data generated by the program implemented by said method, and the touch screen is configured to receive the selections of the interactive regions and to transform said selections into instructions indicating the selections of the specific interactive regions.

10. The authentication device for performing the method as recited in claim 1, comprising a control unit, a memory unit, a number of input circuits, and a screen, said memory unit configured to store the predefined password containing the known character set therein, wherein the control unit is configured to execute a program implemented by said method, the memory unit is configured to store candidate intermediate data generated by the program implemented by said method, the screen is configured to display the plurality of candidate character subsets, and the input circuits are configured to receive the selections of the interactive regions and to transform said selections into instructions indicating the selections of the specific interactive regions.

\* \* \* \* \*